United States Patent
Lee

(10) Patent No.: US 8,839,334 B2
(45) Date of Patent: Sep. 16, 2014

(54) METHOD FOR CONTROLLING INTERFACE

(71) Applicant: Humax Co., Ltd., Seongnam-si (KR)

(72) Inventor: Jonghun Lee, Yongin-si (KR)

(73) Assignee: Humax Co., Ltd., Seongnam-Si (KR)

(*) Notice: Subject to any disclaimer, the term of this patent is extended or adjusted under 35 U.S.C. 154(b) by 51 days.

(21) Appl. No.: 13/678,060

(22) Filed: Nov. 15, 2012

(65) Prior Publication Data

US 2013/0167188 A1    Jun. 27, 2013

(30) Foreign Application Priority Data

Dec. 21, 2011  (KR) .................... 10-2011-0139342

(51) Int. Cl.
| | |
|---|---|
| *H04N 7/173* | (2011.01) |
| *H04N 21/65* | (2011.01) |
| *H04N 21/4363* | (2011.01) |
| *H04N 21/436* | (2011.01) |
| *H04N 21/4402* | (2011.01) |
| *H04L 12/28* | (2006.01) |
| *G06F 3/14* | (2006.01) |

(52) U.S. Cl.
CPC ........ *H04N 21/65* (2013.01); *H04L 2012/2849* (2013.01); *G06F 3/1423* (2013.01); *H04N 21/43635* (2013.01); *H04N 21/43615* (2013.01); *G09G 2360/04* (2013.01); *G09G 2360/02* (2013.01); *H04N 21/440263* (2013.01); *H04L 12/2838* (2013.01); *H04L 12/2809* (2013.01); *G09G 2370/04* (2013.01); *G09G 2370/12* (2013.01)
USPC ............... 725/127; 725/74; 725/81; 725/135; 725/143

(58) Field of Classification Search
USPC ............................. 725/74, 81, 127, 135, 143
See application file for complete search history.

(56) References Cited

U.S. PATENT DOCUMENTS

| | | | | |
|---|---|---|---|---|
| 2007/0280646 | A1* | 12/2007 | Seita et al. ....................... | 386/96 |
| 2008/0244649 | A1* | 10/2008 | Ito et al. .......................... | 725/38 |
| 2009/0033668 | A1 | 2/2009 | Pederson et al. | |
| 2010/0033621 | A1* | 2/2010 | Chang et al. ................... | 348/446 |
| 2011/0209190 | A1 | 8/2011 | Toba | |

FOREIGN PATENT DOCUMENTS

EP    1816868 A1    8/2007

OTHER PUBLICATIONS

Extron Electronics, "Understanding EDID—Extended Display Identification Data", White Paper, Revision 1.0, Nov. 6, 2009, 7 pages provided, XP055055456.

Visual Engineering Lightware, "MX32x32HDMI-Pro, MX16x16HDMI-Pro, MX8x8HDMI-Pro, MX32x32DVI-HDCP-Pro, MX16x16DVI-HDCP-Pro, MX8x8DVI-HDCP-Pro", User's Manual, Sep. 1, 2007, 108 pages provided, XP055055395.

* cited by examiner

*Primary Examiner* — Jivka Rabovianski
(74) *Attorney, Agent, or Firm* — Birch, Stewart, Kolasch & Birch, LLP

(57) ABSTRACT

The method for controlling interface according to one embodiment of the present invention comprises the steps of: detecting the state of connection with one or more sink devices and one or more source devices which are connected to input and output ports of a multimedia interface module; identifying one or more operation modes available for the detected connection state; and transmitting device information of the one or more sink devices to the one or more source devices, the device information being selectively edited in accordance with a requested operation mode among the identified operation modes. Therefore, various operation modes such as Through, Convert, Switch, Mix, Distribute, Duplicate and Exchange can be chosen for effective operation, thereby enhancing the convenience of the user and increasing the performance of interface between the sink devices and source devices.

10 Claims, 7 Drawing Sheets

| Process<br>I:O | Through | Convert | Switch | Mix | Distribute | Duplicate | Exchange |
|---|---|---|---|---|---|---|---|
| 1:1 | Y | Y | - | - | - | - | - |
| N:1 | Y | Y | Y | Y | - | - | - |
| 1:N | Y | Y | - | - | Y | Y | - |
| M:N | Y | Y | Y | Y | Y | Y | Y |

| I:O \ Process | Through | Convert | Switch | Mix | Distribute | Duplicate | Exchange |
|---|---|---|---|---|---|---|---|
| 1:1 | Y | Y | - | - | - | - | - |
| N:1 | Y | Y | Y | Y | - | - | - |
| 1:N | Y | Y | - | - | Y | Y | - |
| M:N | Y | Y | Y | Y | Y | Y | Y |

METHOD FOR CONTROLLING INTERFACE

BACKGROUND

1. Field

The present invention relates to a method for controlling interface and, more particularly, to a method for controlling input and output of multimedia interface that can transmit device information to other devices.

2. Description of the Related Art

HDMI, DVI and D-Sub are generally used as multimedia interface. For example, the repeater, often referred to as a media relay or other names, connects source devices and output devices through HDMI.

As illustrated in FIG. 1, various types of source devices providing audio or video signals such as a DVD player 300 are connected to the repeater 200 through HDMI input port.

Also, various types of sink devices outputting audio and/or video signals such as digital TV (D-TV) can be connected to the repeater 200 through HDMI output port.

Then, the repeater 200 transmits EDID (Extended Display Identification Data), which is a type of data base structure including data on the sink device (such as audio and video formats that can be output by the sink device) to the source device 300 through CEC (Consumer Electronic Control) line of HDMI, and the source device 300, by referencing the EDID, outputs audio and/or video signal which is optimal to the sink device 100. For example, the EDID information can include information on the native format, or the optimal A/V (Audio/Video) format that can be output from the sink device 100.

If HD level is detected, by referencing the EDID, as the optimal video format that can be displayed on the sink device 100, the source device 300 outputs video in the format of HD level instead of full HD level even though the source device 300 can output video data in the video format up to full HD level.

Recently, repeaters equipped with a HDMI module having a plurality of input and output ports have been commercialized, in which, as illustrated in FIG. 2, various types of source devices (300$1$-300$n$) such as a DVD player and BD player can be connected to the repeater 200 through input ports of HDMI module, and various types of sink devices (100$1$-100$m$) such as a digital TV (D-TV) and high definition digital TV (HD-TV) can be connected to the repeater through output ports of the HDMI module digital TV (D-TV).

For example, in the repeater, as illustrated in FIG. 3, one source device (Source #1) and one sink device (Sink #1) can be connected respectively to a plurality of input ports (e.g., I1-I3) and output ports (e.g., O1-O3) installed on the HDMI module of the repeater, or multiple source devices (e.g., Source #1-#3) and one sink device (Source #1) can be connected.

Also, one source device (Source #1) and multiple sink devices (e.g., Sink #1-#3) can be connected to a plurality of input and output ports installed on the HDMI module of the repeater, or multiple source devices (e.g., Source #1-#3) and sink devices (e.g., Source #1-#3) can be connected. In other words, various combinations of connections are possible depending on the number of the source devices and sink devices connected to the input and output ports.

Although various operation modes are available to the repeater for performing relay operation between the source and sink devices, a method for efficiently controlling each operation mode according to the combination of the devices connected through the input and output ports has not been provided.

The present invention has been designed to solve the above mentioned problems, and aims to prevent compatibility problems in configuring audio/video setting between devices when one or more source devices and sink devices are connected to the repeater.

Another objective of the present invention is to provide a method for controlling operation modes taking consideration of the combination of source and sink devices connected to the repeater.

SUMMARY

The method for controlling interface according to one embodiment of the present invention comprises detecting state of connection with one or more sink devices and one or more source devices which are connected to input and output ports of a multimedia interface module; identifying one or more operation modes available for the detected connection state; and transmitting device information of the one or more sink devices to the one or more source devices, the device information being selectively edited in accordance with a requested operation mode among the identified operation modes.

The repeater according to one embodiment of the present invention comprises: a multimedia interface module having a plurality of input ports and output ports for connecting source devices and sink devices; and a control unit configured to detect a connection state of one or more sink devices and one or more source devices respectively connected to the input ports and output ports, identify one or more operation modes available for the detected connection state, selectively edit device information of the one or more sink devices according to a requested operation mode among the identified operation modes, and transmit the edited information to the one or more source devices.

In another embodiment of the present invention, the one or more operation modes include at least one of Through, Convert, Switch, Mix, Distribute, Duplicate and Exchange.

In yet another embodiment of the present invention, the operation modes including Through, Convert, Switch and Mix are available when two or more source devices and one sink device are connected, the operation modes including Through, Convert, Distribute and Duplicate are available when one source device and two or more sink devices are connected, and the operation modes including Through, Convert, Switch, Mix, Distribute, Duplicate and Exchange are available when two or more source devices and two or more sink devices are connected.

In yet another embodiment of the present invention, when the operation mode is Through, the information on the format of the best quality for the sink device is transmitted to the source device; and A/V signal is received from the source device and transmitted to the sink device.

In yet another embodiment of the present invention, when the operation mode is Convert, the information on the formats that the repeater can handle is generated by referring to the device information of the sink device, and transmitted to the source device; and A/V signal is received from the source device, converted to the format appropriate for the device information of the sink device, and transmitted to the sink device.

In yet another embodiment of the present invention, when the operation mode is Switch, one source device is selected from the two or more source devices connected, and the device information of the sink device is transmitted to the selected source device; and A/V signal is received from the selected source device and transmitted to the sink device.

In yet another embodiment of the present invention, when the operation mode is Mix, the device information of the sink device is edited in the format which is available to the sink device and common to two or more source devices connected, and transmitted to the two or more of source devices; and A/V signal is received from the two or more of source devices, mixed, and transmitted to the sink device.

In yet another embodiment of the present invention, when the operation mode is Mix, the optimal format information of the sink device is transmitted to a first source device, and format information which is lower than the optimal format information is transmitted to the second source device; and the A/V signals from the first source devices and the second source devices are mixed to a main display and a sub display respectively, and transmitted to the sink device.

In yet another embodiment of the present invention, when the operation mode is Distribute, one sink device is selected from two or more sink devices connected, and the device information of the selected sink device is transmitted to the source device; and A/V signal is received from the source device and transmitted to the selected sink device.

In yet another embodiment of the present invention, when said operation mode is Duplicate, the information on the format which is common to two or more of sink devices is transmitted to the source device; and A/V signal is received from the source device and transmitted to the sink device.

In yet another embodiment of the present invention, when the operation mode is Exchange, the device information of the connected sink device is transmitted to two or more source devices; and A/V signal is received from the source device and transmitted to the sink device connected.

Therefore, various operation modes such as Through, Convert, Switch, Mix, Distribute, Duplicate and Exchange can be chosen for effective operation, thereby enhancing the convenience of the user and increasing the performance of interface between the sink device and source device.

DETAILED DESCRIPTION OF PREFERRED EMBODIMENTS

Preferred embodiments of the device and method for controlling interface according to the present invention will be described below with reference to the drawings attached.

First, the method for controlling interface according to the present invention can be applied to a repeater, or a media relay as it is often referred to, equipped with, for example, a multimedia interface module (such as HDMI module) including a plurality of input and output ports.

Also, the repeater can be manufactured as an independent electronic device, or built in specific devices such as Home Media Server or IP set-top box (IP-STB).

The repeater according to the present invention can determine optimal output condition for each operation mode (or process) and provide the information to the source device, in which data format such as EDID, which provides performance information of the sink device, can be used to provide the source device with the format which is optimal to the format and/or operation mode available to the sink device.

Figure 1:
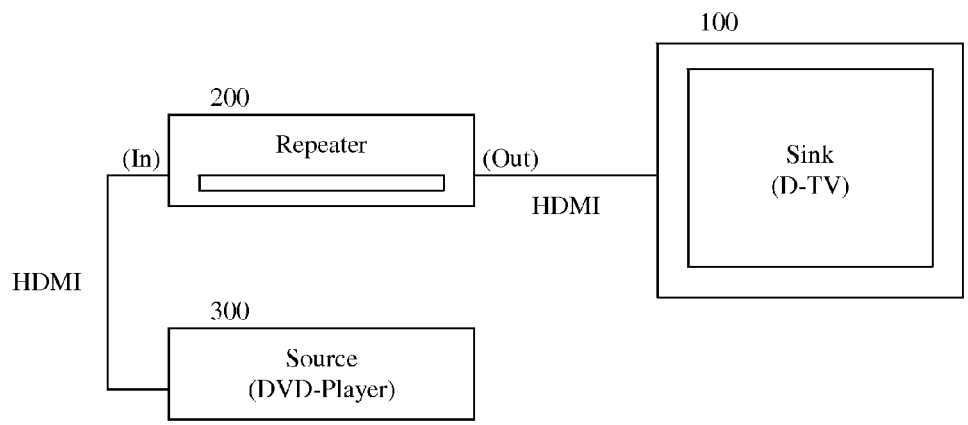
FIG. 1 illustrates the state where a source device and a sink device are connected to the HDMI module of a repeater.
Figure 2:
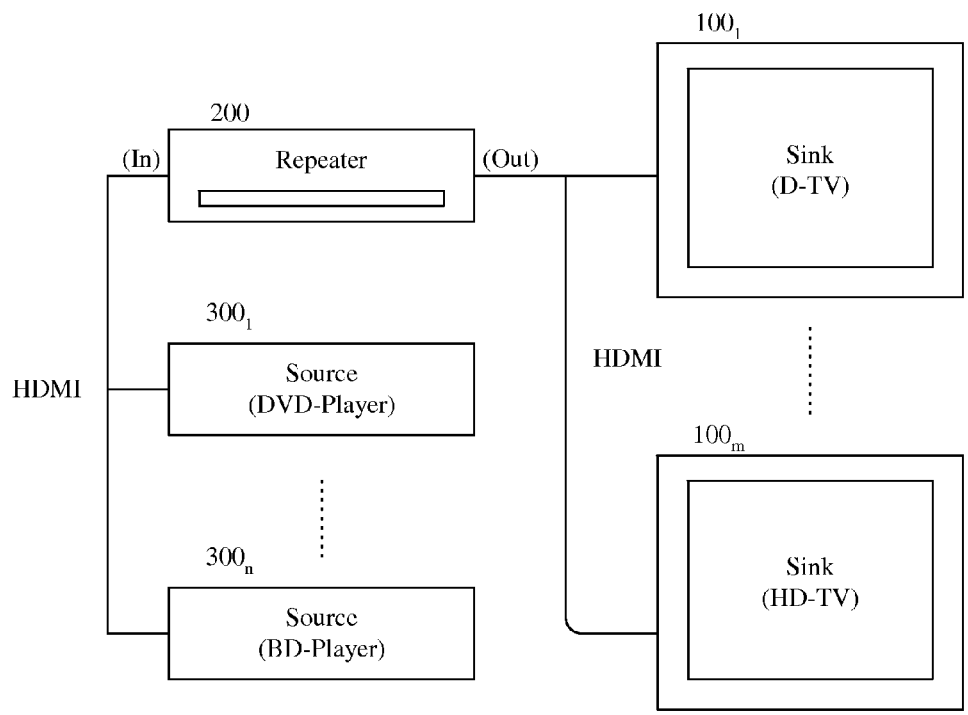
FIG. 2 illustrates the state where multiple source devices and sink devices are connected to the HDMI module of a repeater.
Figure 3:
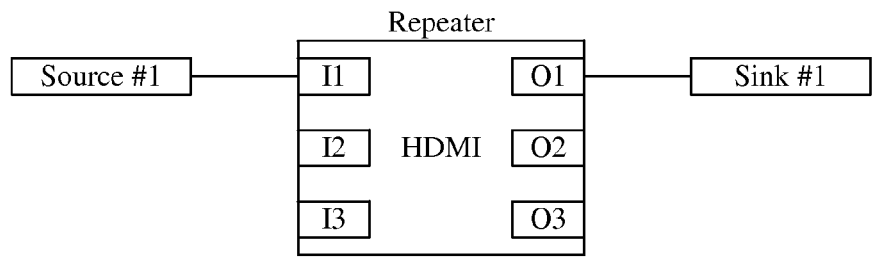
FIG. 3 illustrates the state where at least one source device and at least one sink device are connected to the input and output port of a repeater.
Figure 3:
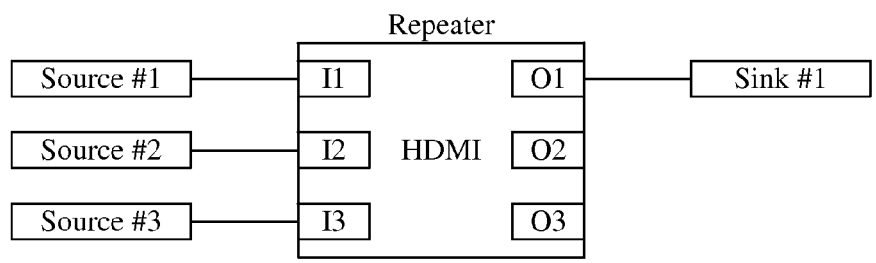
Figure 3:
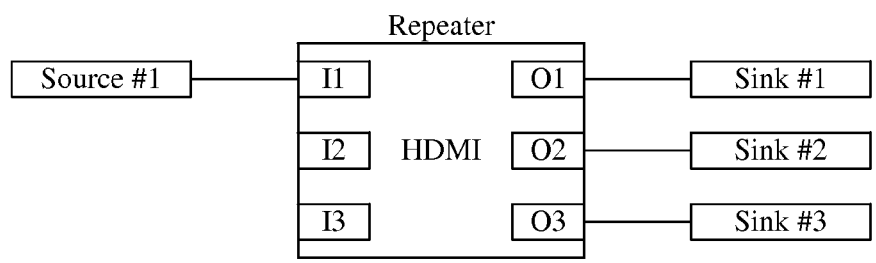
Figure 3:
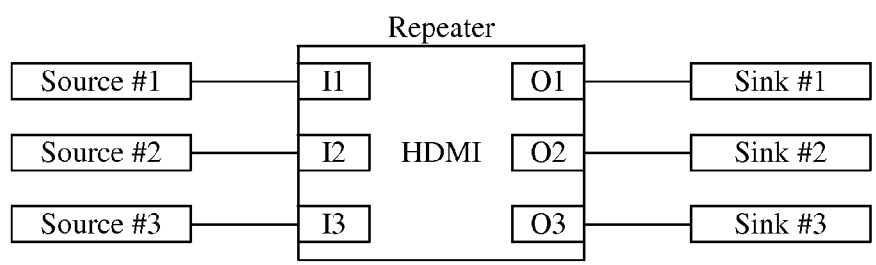
Figures 4, 5:
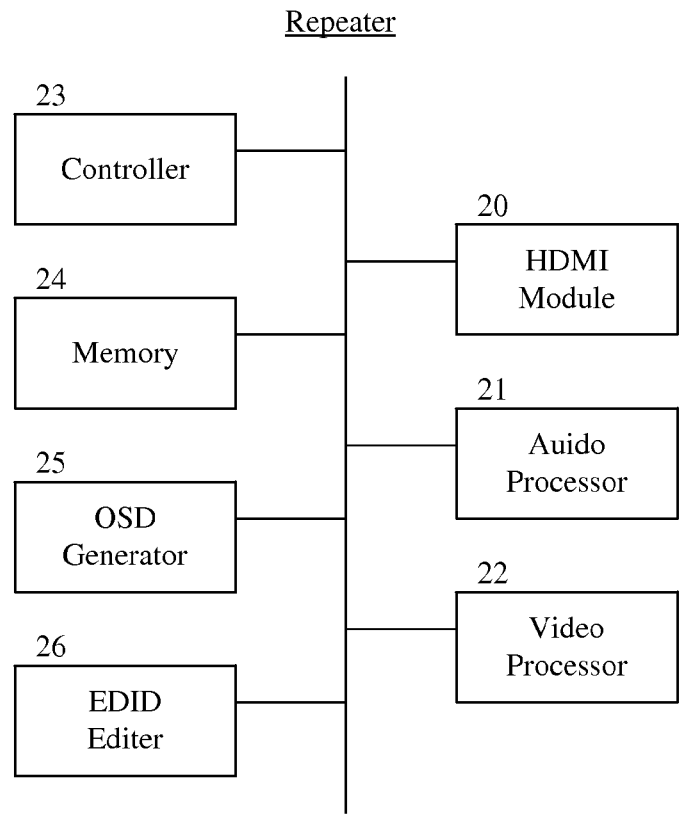
FIG. 4 illustrates the construction of the repeater according to one embodiment of the present invention, in which methods control for each operation mode are applied.
FIG. 5 is the table defining the operation modes according to one embodiment of the present invention, which are available for combinations of connections between source devices and sink devices.
Figure 6:
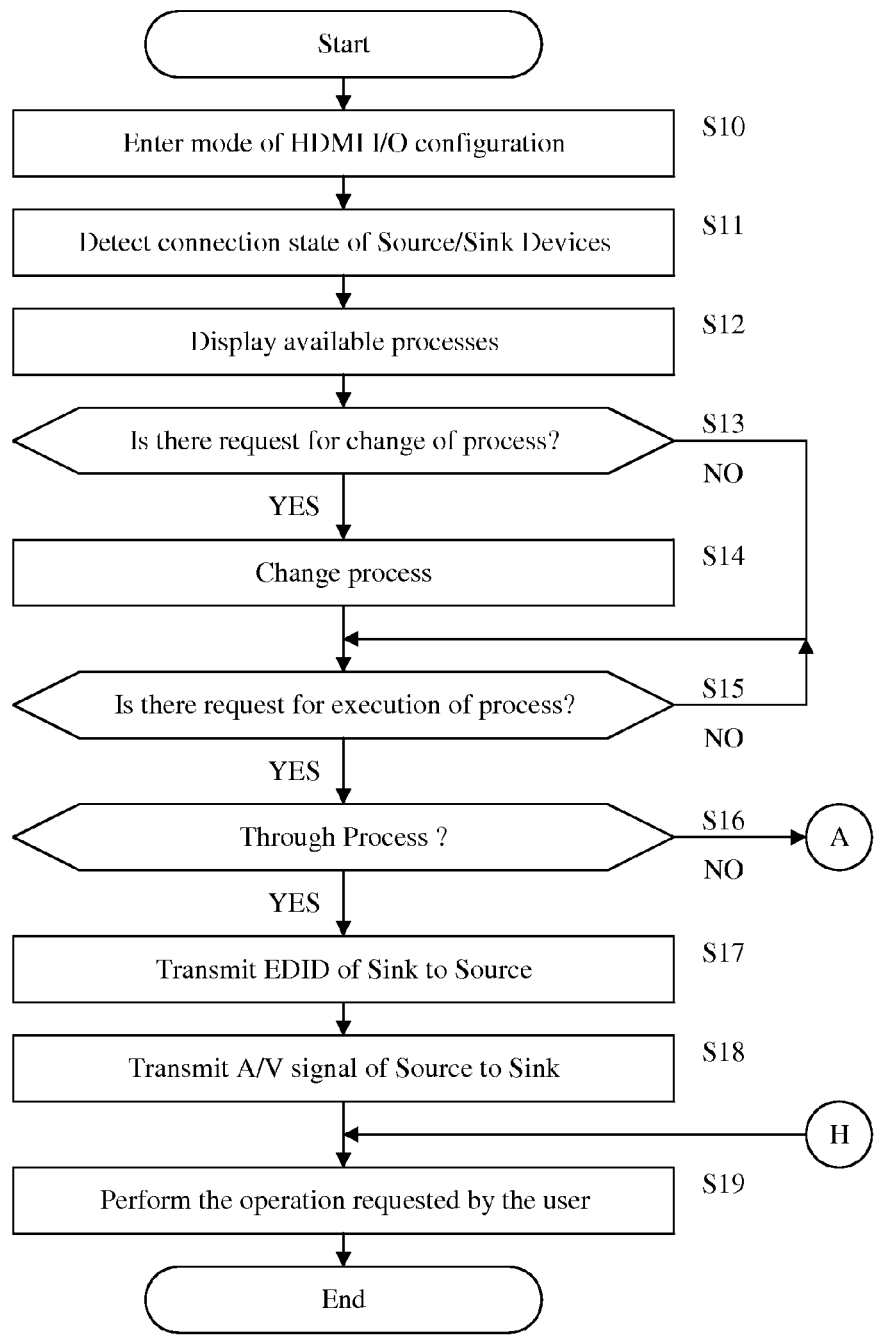
FIGS. 6 through 12 illustrate the flow of operation of the control method for each operation mode in the repeater according to one embodiment of the present invention.

For example, the repeater using the method of the present invention can comprise, as shown in FIG. 4, a HDMI module 20, an audio processor 21, a video processor 22, a control unit 23, memory 24, an OSD (On Screen Display) generator 25 and an EDID editor.

Additionally, non-volatile memory such as flash memory or EEPROM can be used for the memory 24, and the EDID editor 26 can be included as a separate constituting device independent of the control unit 23, or implemented by software executed in the control unit 23.

The control unit 23 detects connection states of the source devices and sink devices connected to input ports and output ports of the HDMI module 20 respectively, and automatically identifies the available operation mode for the combination of input and output devices detected above, the available operation mode being selected from, for example, a group of 7 operation modes (processes) consisted of Through, Convert, Switch, Mix, Distribute, Duplicate and Exchange.

For example, in the case of combination where, as illustrated in FIG. 5, one source device is connected to the input port of the HDMI module and one sink device is connected to the output port (1:1 IO), the control unit 23 identifies Through and Convert as the available operation modes.

In the case of combination where N source devices are connected to the input ports of the HDMI module and one sink device is connected to the output port (N:1 IO), Through, Convert, Switch and Mix are identified as the available operation modes.

Also, In the case of combination where one source device is connected to the input port of the HDMI module and N sink devices are connected to the output ports (1:N IO), Through, Convert, Distribute and Duplicate are identified as the available operation modes.

Finally, In the case of combination where M source devices are connected to the input ports of the HDMI module and N sink devices are connected to the output ports (M:N IO), all the 7 operation modes of Through, Convert, Switch, Mix, Distribute, Duplicate and Exchange are identified as the available operation modes.

The control unit 23 controls the OSD generator 25 to display available operation modes on an arbitrary sink device or on a predetermined sink device through OSD screen so that a user can easily check the available operation modes for the combination of connected source and sink devices, or change the current operation mode to other one.

If the user requests change of operation mode through OSD screen, the control unit 23 stops the execution of the process for currently set operation mode, selectively edits the EDID information of the sink device according to operation mode to be changed, and executes the interface operation of transmitting the information to the source device, which will be described in more detail below.

FIGS. 6 through 12 illustrate the flow of operation of the control method according to one embodiment of the present invention.

When the system is turned on or requested by a user, for example, the control unit 23 makes the device enter the HDMI input/output (I/O) configuration mode (S10).

Then, the control unit 23 detects the connection state of the source and sink devices connected to the input and output ports of the HDMI module 20 (S11), identifies available operation modes (or processes) based on the combination of connected input and output devices by using the method described above with reference to FIG. 5, and controls the OSD generator 25 to display the available processes identified above on the screen of an arbitrary or predetermined sink device (S12). The control unit 23 can automatically set one operation mode from the identified operation modes as the current operation mode and display the mode on the OSD screen.

If a user requests execution of certain operation mode or change of the process set to current operation mode (S13), the control unit 23 stops execution of the corresponding process, identifies the type of requested process, and performs the operation of setting the process as current operation mode (S14).

And when a certain process is requested to be executed later (S15), if the requested process corresponds to, for example, the Through process between the first source device and the first sink device (S16), the control unit 23 reads out the EDID information of the first sink device (Sink #1) connected to the output port of the/HDMI module and transmits the information to the first source device (Source #1) connected to the input port of the HDMI module (S17), in which step the highest resolution of the first sink device (Sink #1) can be selected and transmitted to the first source device (Source #1).

The first source device (Source #1) outputs optimal A/V signal which is acceptable to the first sink device (Sink #1) by referring to the EDID information, and the control unit 23, upon receiving the A/V signal, performs the interface control operation of the Through process by transmitting the signal to the first sink device (Sink #1) (S18), and then performs an arbitrary operation requested by the user (S19).

Figure 7:
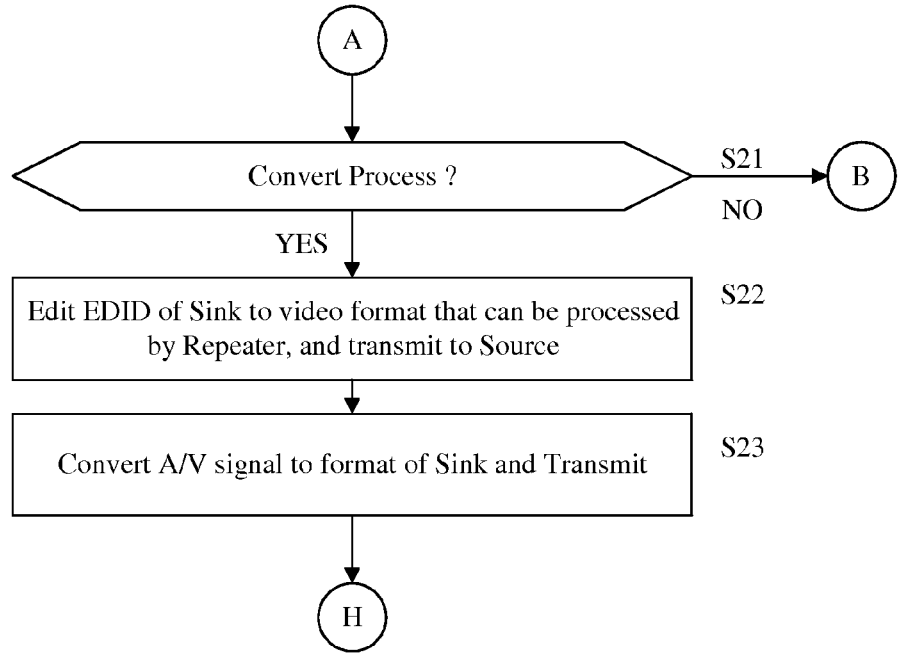

In the case where the requested process corresponds to the operation of Convert between the first source device and the first sink device, as illustrated in FIG. 7 (S21), the control unit 23 reads out and temporarily stores the EDID information of the first sink device (Sink #1) connected to the output port of the HDMI module, controls the EDID editor 26 to edit the temporarily stored EDID information to the video format that can be handled by the repeater, and transmits the information to the first source device (Source #1) connected to the input port of the HDMI module (S22).

The first source device (Source #1) outputs A/V signal which can be handled by the repeater by referring to the edited EDID information, and if, for example, the optimal video format of the first sink device is SD level, the video format that the repeater can handle is HD level and the optimal video format of the first source device is full HD level, the first source device outputs video signal of HD level by referring the edited EDID information, and the repeater converts the video signal of HD level to the video signal of SD level and transmits the signal to the first sink device.

In other words, the control unit 23 performs the interface control operation of the Convert process by controlling the audio processor 21 and the video processor 22 to convert the A/V signal received from the first source device to the optimal A/V signal which is acceptable at the first sink device, and transmitting the signal to the first sink device (S23).

Figure 8:
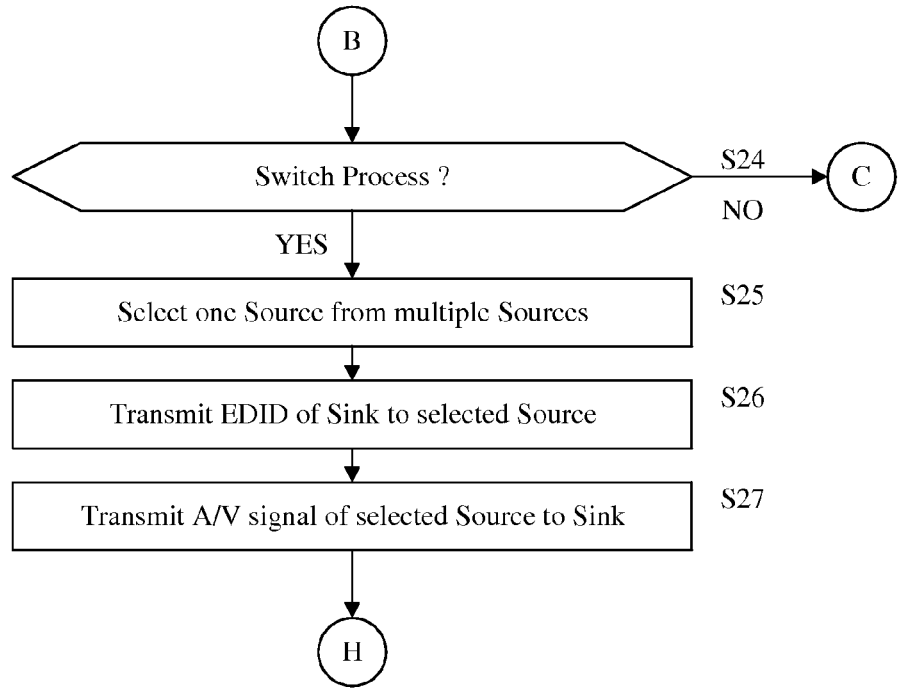

For example, in the case where Switch process between one of the multiple source devices and the first sink device is executed, as illustrated in FIG. 8 (S24), the control unit 23 selects one source device from the multiple source devices connected to the input port of the HDMI module (S25), If the second source device (Source #2) is selected from the multiple source devices, for example, the EDID information of the first sink device (Sink #1) is read out and transmitted to the second source device (Source #2) (S26).

Then, the second source device (Source #2) outputs optimal A/V signal which is acceptable to the first sink device (Sink #1), and the control unit 23 performs the interface control operation of the Switch process by receiving the signal and transmitting the signal to the first sink device (Sink #1) (S27).

Figure 9:
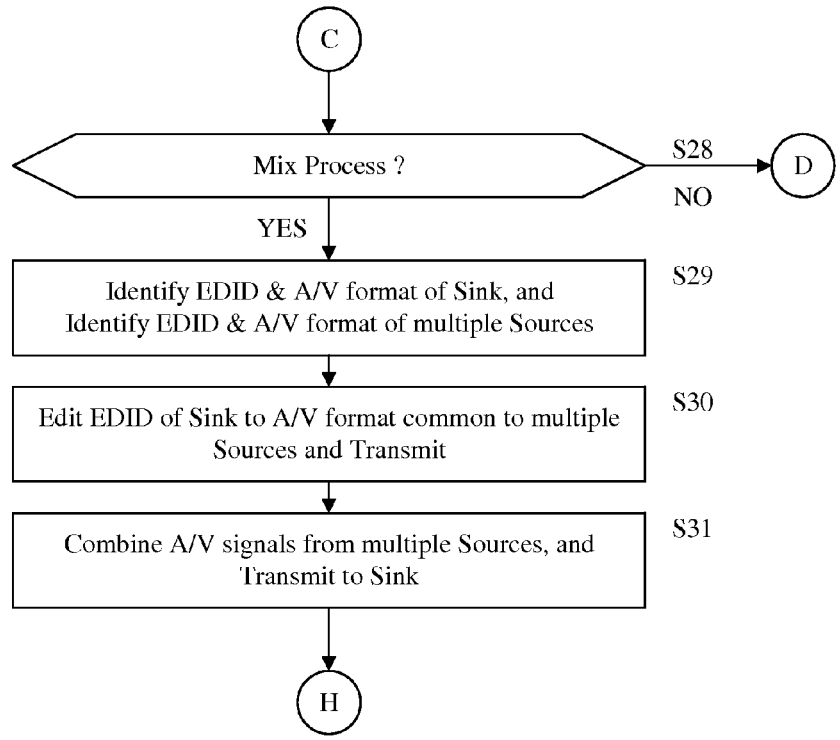

For example, if Mix process between the first and second source devices and the first sink device is executed, as illustrated in FIG. 9 (S28), the control unit 23 identifies the EDID information and A/V format of the first sink device (Sink #1), and also identifies the EDID information and A/V format of the first and second source devices (Source #1, #2) (S29).

Then, the EDID information of the first sink device is edited to match the A/V format common to both the first and second source devices. For example, if the optimal video format of the first sink device is HD level, the optimal video format of the first source device is full HD level, and the optimal video format of the second source device is SD level, then the control unit 23 selects the video format of SD level that is acceptable to the first sink device and, at the same time, common to the first and second source devices, and edits the EDID information to match SD level, and then transmits the edited EDID information to the first and second source devices (S30).

Also, the first and second source devices outputs optimal A/V signal that is acceptable to the first sink device, which is a video format of SD level, by referring to the edited EDID information.

Then, the control unit 23 controls the video processor 22 performs the interface control operation of the Mix process by mixing the video signal of SD level received from the first and second source devices and transmitting the signal to the first sink device (S31).

Meanwhile, the Mix process may corresponds to the case where the first sink device outputs the contents supplied by different source devices in the PIP (Picture In Picture) mode. If image of the first source device is displayed on the main screen of the first sink device and image of the second source device is displayed on the sub screen, the control unit 23 provides the first source device with the video format information optimal to the first sink device, and provides the second source device with the video format information which is lower than the one provided to the first source device.

Figure 10:
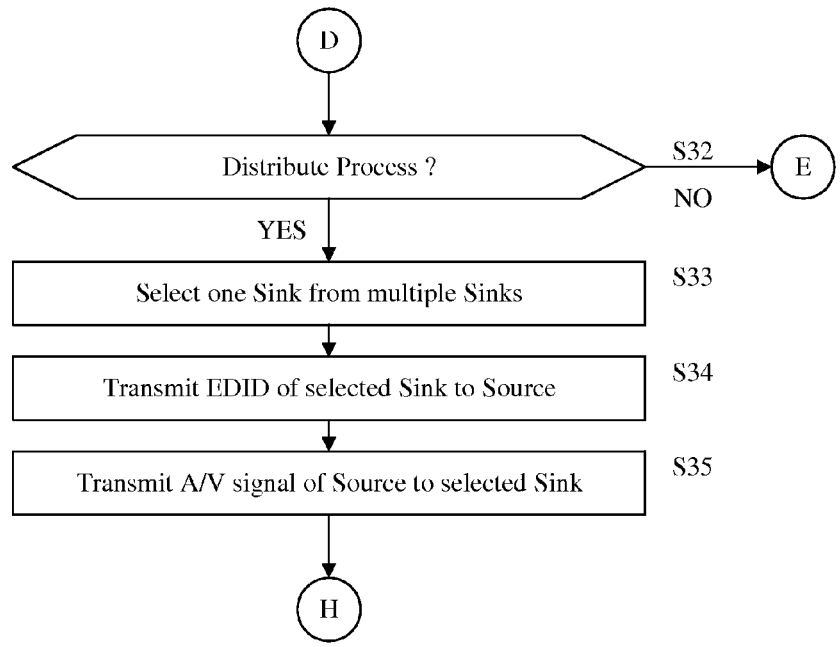

For example, in the case where Distribute process between one of the multiple sink devices and the first source device, as illustrated in FIG. 10 (S32), the control unit 23 selects one of the multiple sink devices connected to the output of the HDMI module (S33), If the second sink device (Sink #2) is selected, for example, the EDID information of the selected second sink device is read out and transmitted to the first source device (Source #1) (S34), and then the first source device (Source #1) outputs A/V signal which is optimal to the second sink device (Sink #2) by referring to the EDID information, and the control unit 23 performs the interface control operation of the Distribute process by transmitting the A/V signal to the second sink device (S35).

Figure 11:
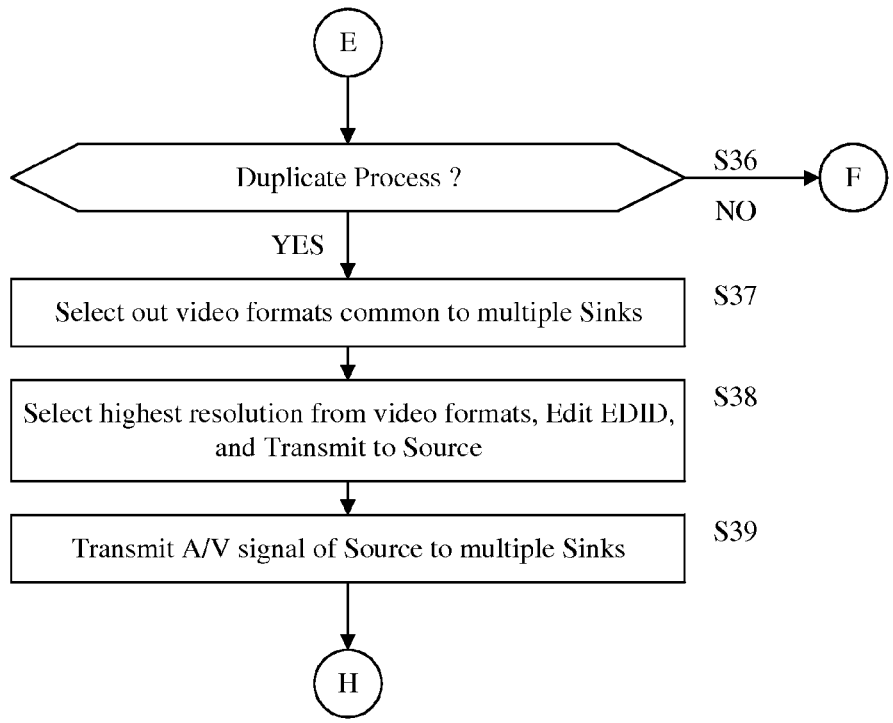

For example, in the case where, as illustrated in FIG. 11, Duplicate process between the first source device and multiple sink devices is executed (S36), the control unit 23 reads out and temporarily stores the EDID information of multiple sink devices connected to the output port of the HDMI module, and selects out a common video format which is acceptable to the multiple sink devices (S37).

For example, if the optimal video format of the first sink device is full HD level and the optimal video format of the second sink device is HD level, HD level is selected as a common video format, the EDID information is edited to match the selected HD level, and the edited EDID information is transmitted to the first source device (S38).

Then, the first source device outputs A/V signal which is acceptable to both the first and second sink devices by referring to the EDID information edited as above, in which case the video signal becomes HD level, and the control unit 23, upon receiving the A/V signal, performs the interface control operation of the Duplicate process by transmitting the signal to the first and second sink devices (S39).

Figure 12:
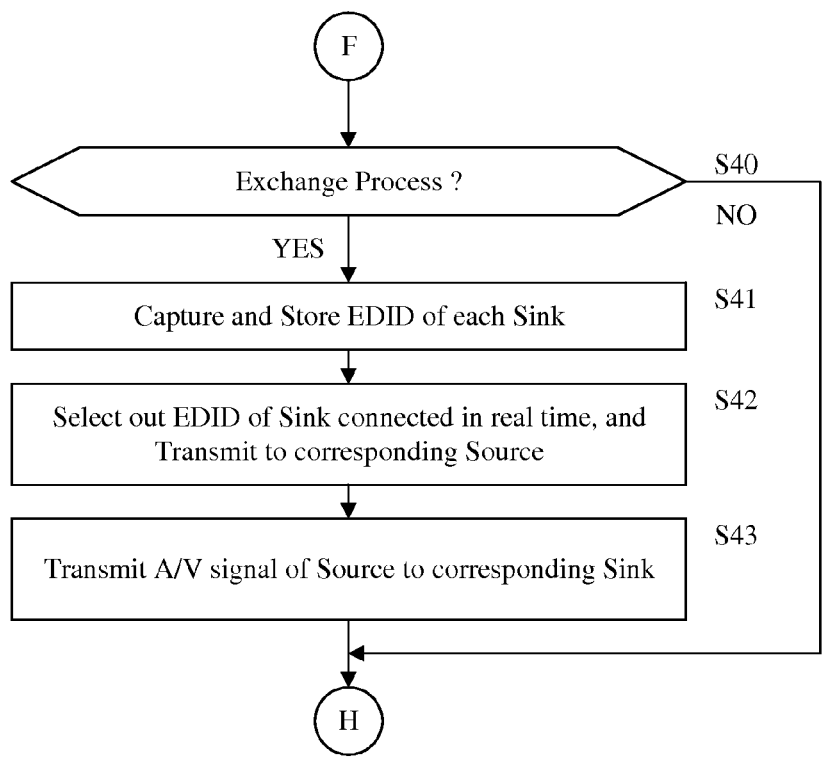

For example, when Exchange process between multiple source devices and multiple sink devices is executed as illustrated in FIG. 12 (S40), the control unit 23 captures and stores EDID information of the multiple source and sink devices connected to the input and output ports of the HDMI module (S41).

Then, the control unit 23 connects an arbitrary source device and sink device in real time, in which step the EDID information of the sink device connected in real time is read out and transmitted to the corresponding source device (S42).

Also, the corresponding source device outputs A/V signal which is optimal to the corresponding sink device by referring to the EDID information, and the control unit 23 performs the interface operation of receiving the A/V signal and transmitting the signal to the connected sink device (S43).

Therefore, various operation modes such as Through, Convert, Switch, Mix, Distribute, Duplicate and Exchange can be chosen for effective operation, thereby enhancing the convenience of the user and increasing the performance of multimedia relay of the repeater.

Meanwhile, the HDMI module is, as described above, one example of multimedia interface modules, and other multimedia interface module such as DVI or D-Sub can be used. Also, the EDID information is one example of identification data for identifying the performance of audio/video devices.

Preferred embodiments of the present invention have been disclosed above for the purpose of illustrating the technical idea of the invention, and it will be recognized that those skilled in the art to which the present invention belongs could make improvement, modification, substitution or addition to the embodiments of the invention within the scope of the invention as described in claims without departing from the technical idea of the present invention.

What is claimed is:

1. A method for controlling interface, comprising:
   detecting a state of connection with one or more sink devices and one or more source devices which are connected to input and output ports of a multimedia interface module;
   identifying at least one operation mode available for the detected connection state; and
   transmitting device information of the one or more sink devices to the one or more source devices, the device information being selectively edited in accordance with a requested operation mode among the identified at least one operation mode,
   wherein the at least one operation mode includes at least one of Through, Convert, Switch, Mix, Distribute, Duplicate and Exchange, and
   wherein the at least one operation mode including Through, Convert, Switch and Mix are available when two or more source devices and one sink device are connected, the at least one operation mode including Through, Convert, Distribute and Duplicate are available when one source device and two or more sink devices are connected, and the at least one operation mode including Through, Convert, Switch, Mix, Distribute, Duplicate and Exchange are available when two or more source devices and two or more sink devices are connected.

2. The method of claim 1, wherein the step of transmitting device information further comprises steps of:
   transmitting, when the at least one operation mode is Through, information on a format of a best quality for the sink device to the source device; and
   receiving A/V signal from the source device and transmitting the signal to the sink device.

3. The method of claim 1, wherein the step of transmitting device information further comprises steps of:
   generating, when the at least one operation mode is Convert, information on a format that a repeater can handle by referring to the device information of the sink device, and transmitting the information to the source device; and
   receiving A/V signal from the source device, converting the signal to the format appropriate for the device information of the sink device, and transmitting the converted signal to the sink device.

4. The method of claim 1, wherein the step of transmitting device information further comprises steps of:
   selecting, when the at least one operation mode is Switch, one from the two or more source devices connected, and transmitting the device information of the sink device to the selected source device; and
   receiving A/V signal from the selected source device and transmitting the signal to the sink device.

5. The method of claim 1, wherein the step of transmitting device information further comprises steps of:
   editing, when the at least one operation mode is Mix, the device information of the sink device in a format which is available to the sink device and common to two or more source devices connected, and transmitting the edited device information to the two or more source devices; and
   receiving A/V signal from the two or more source devices, mixing the signal, and transmitting the mixed signal to the sink device.

6. The method of claim 1, wherein the step of transmitting device information further comprises steps of:
   transmitting, when the at least one operation mode is Mix, optimal format information of the sink device to a first source device, and transmitting format information which is lower than the optimal format information to the second source device; and
   mixing A/V signal from the first source devices as a main display and A/V signal from the second source devices as a sub display, and transmitting the mixed signal to the sink device.

7. The method of claim 1, wherein the step of transmitting device information further comprises steps of:
   selecting, when the at least one operation mode is Distribute, one from two or more sink devices connected, and transmitting the device information of the selected sink device to the source device; and
   receiving A/V signal from the source device and transmitting the signal to the selected sink device.

8. The method of claim 1, wherein the step of transmitting device information further comprises steps of:

transmitting, when the at least one operation mode is Duplicate, information on a format which is common to two or more sink devices to the source device; and receiving A/V signal from the source device and transmitting the signal to the sink device.

9. The method of claim 1, wherein the step of transmitting device information further comprises steps of:

transmitting, when the at least one operation mode is Exchange, the device information of the connected sink device to two or more source devices; and receiving A/V signal from the source device and transmitting the signal to the sink device connected.

10. A repeater comprising:

a multimedia interface module having a plurality of input ports and output ports for connecting source devices and sink devices; and a control unit configured to detect a connection state of one or more sink devices and one or more source devices respectively connected to the input ports and output ports, identify at least one operation mode available for the detected connection state, selectively edit device information of the one or more sink devices according to a requested operation mode among the identified at least one operation mode, and transmit the edited information to the one or more source devices, wherein the at least one operation mode includes at least one of Through, Convert, Switch, Mix, Distribute, Duplicate and Exchange, and wherein the at least one operation mode including Through, Convert, Switch and Mix are available when two or more source devices and one sink device are connected, the at least one operation mode including Through, Convert, Distribute and Duplicate are available when one source device and two or more sink devices are connected, and the at least one operation mode including Through, Convert, Switch, Mix, Distribute, Duplicate and Exchange are available when two or more source devices and two or more sink devices are connected.

* * * * *